United States Patent
Brancolini et al.

(10) Patent No.: US 7,097,260 B2
(45) Date of Patent: Aug. 29, 2006

(54) PARKING BRAKE FOR A TRACTOR

(75) Inventors: Emiliano Brancolini, Modena (IT);
Paolo Lelli, Vignola (IT)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/939,808

(22) Filed: Sep. 13, 2004

(65) Prior Publication Data

US 2005/0077781 A1    Apr. 14, 2005

(30) Foreign Application Priority Data

Sep. 15, 2003    (IT) ........................... BO2003A0533

(51) Int. Cl.
*B60T 13/74*    (2006.01)

(52) U.S. Cl. ............................ 303/2; 303/89; 188/265; 188/106 P; 188/106 F

(58) Field of Classification Search ................. 303/15, 303/2, 89, 1; 188/20, 106 P, 106 F, 265, 188/72.1, 72.3, 72.7, 72.9, 2 P, 31; 192/219.4, 192/219.6, 221; 74/535, 527

See application file for complete search history.

(56) References Cited

U.S. PATENT DOCUMENTS

| 3,703,941 | A | * | 11/1972 | Ohie et al. ..................... 188/31 |
| 4,273,388 | A | * | 6/1981 | Muller ......................... 303/89 |
| 4,614,256 | A | * | 9/1986 | Kuwayama et al. ..... 192/219.5 |
| 4,727,967 | A | * | 3/1988 | Ogasawara et al. ...... 192/219.5 |
| 4,746,171 | A | * | 5/1988 | Engle ........................... 303/13 |
| 5,131,288 | A | * | 7/1992 | Barlas ......................... 74/512 |
| 5,309,786 | A | * | 5/1994 | Pare et al. .................... 74/512 |
| 6,105,459 | A | * | 8/2000 | Troiano ....................... 74/542 |
| 6,126,246 | A | * | 10/2000 | Decker et al. ................. 303/7 |
| 6,877,395 | B1 | * | 4/2005 | Reese et al. .................. 74/512 |

* cited by examiner

*Primary Examiner*—James McClellan
*Assistant Examiner*—Mariano Sy
(74) *Attorney, Agent, or Firm*—Stephen A. Bucchianeri; John William Stader; Michael C. Harms

(57) ABSTRACT

A parking brake for a motor vehicle includes: a manual operating lever; a braking device designed to act on brake disks applied on a bevel pinion for transmission of the motion to the wheels of the motor vehicle; and a cable for transmission of the command imposed via the lever on the braking device. The brake is activated either automatically by a hydraulic actuator when the engine of the motor vehicle is turned off, or alternatively, by a manual command imposed by the operator through the lever whether or not the engine of the motor vehicle is running.

8 Claims, 5 Drawing Sheets

SEZ.A-A

PARKING BRAKE FOR A TRACTOR

BACKGROUND OF THE INVENTION

The present invention relates to a parking brake for a motor vehicle, in particular for a tractor.

As is known, a parking brake, referred to commonly as "hand brake," enables parking of the motor vehicle just by acting on the brake lever located in the cab. Consequently, the operator, even in the case where the engine of the motor vehicle is turned off, must engage the parking brake manually.

It has thus appeared desirable to provide a parking brake that may be activated automatically whenever the engine of the motor vehicle is turned off, and which, in any case, may be able to function as a traditional hand brake, and hence can be engaged manually by the operator, even when the engine of the motor vehicle is on. In the latter case, the motor vehicle should not have any gear engaged and, hence, be in neutral.

Consequently, a purpose of the present invention is to provide a parking brake that will carry out the aforesaid functions.

BRIEF DESCRIPTION OF THE DRAWINGS

The present invention will now be described further, by way of example, with reference to the accompanying drawings showing a non-limiting example of embodiment thereof, in which.

DETAILED DESCRIPTION OF THE PREFERRED EMBODIMENT

Figure 1:
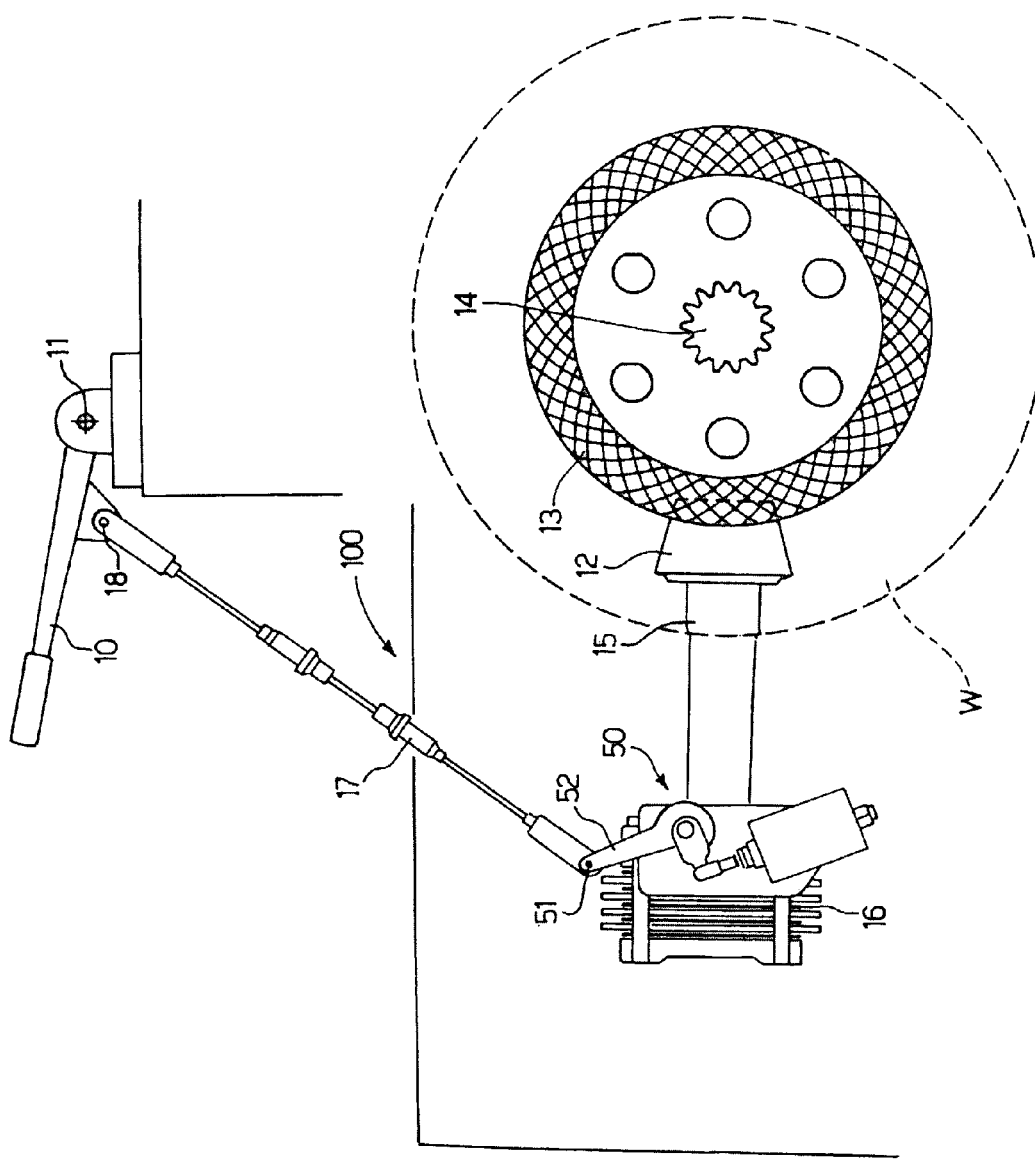
FIG. 1 illustrates, as a whole, a parking brake according to the invention.

FIG. 1 shows a parking brake 100 according to the preferred embodiment. The parking brake 100 comprises a manual operating lever 10 which is pivoted on a fulcrum 11 and is located in a control cab (not illustrated) of a motor vehicle (not illustrated).

The parking brake 100 has the purpose of braking a bevel pinion 12, which meshes with a fitted crown wheel 13, which transfers the motion to two axle shafts 14 (FIG. 1 shows only one of them) on which are mounted two drive wheels W (only one shown in FIG. 1) of the motor vehicle.

A spindle 15, unitary connected with the pinion 12, carries a plurality of brake disks 16 actuated by a braking device 50, the constructional elements of which will be described in greater detail hereinafter with particular reference to the other annexed figures. In order to operate the braking device 50, a cable 17 (preferably of a Bowden type, although other cables or even other types of linkages may be used) is disposed between the lever 10 and the braking device 50.

More in particular, the cable 17 (FIG. 1) is connected, on one side, to an eyelet 18 made on the lever 10, whilst, on the other side, it is connected to an eyelet 51 provided on a relay lever 52, which forms an integral part of the aforementioned braking device 50 (see further).

It is to be understood that in the ensuing description only the items present in the attached drawings that are essential for an understanding of the present invention will be numbered and described.

Figures 2, 3:
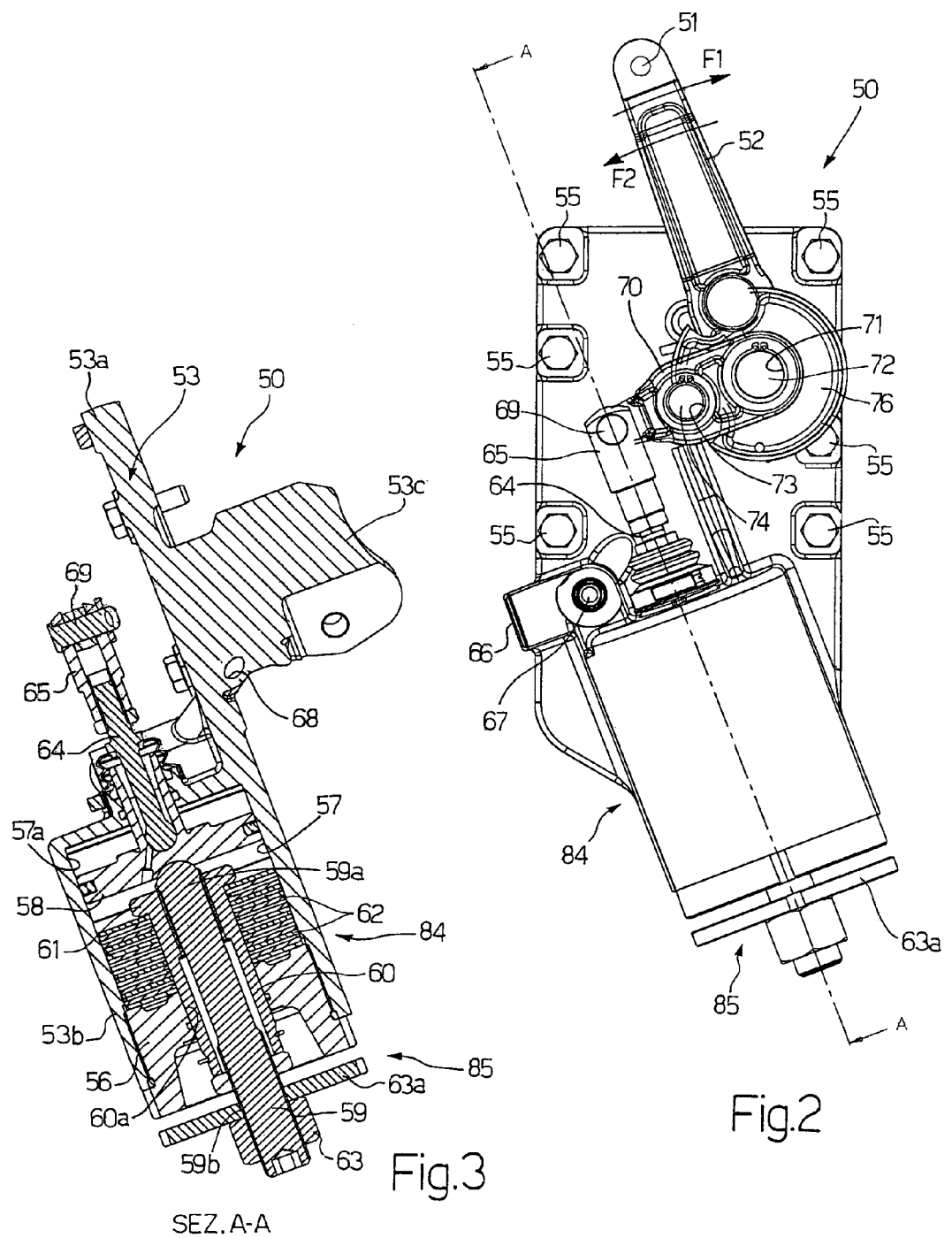
FIG. 2 is a front view of a braking device used in the parking brake according to the invention.
FIG. 3 is a cross-sectional view according to the line A—A of the braking device of FIG. 2.

Referring now to FIGS. 2 and 3, the braking device 50 comprises a main body 53, which provides, preferably as a single unit, a plate 53a for fixation to the frame (not shown) of the motor vehicle, a cylinder 53b, and projecting portions 53c, which are designed to support the brake disks 16 (visible only in FIG. 1). Furthermore, the plate 53a comprises six through holes 54, each of which is provided with a respective bolt 55 for fixing to the rear transmission case (not illustrated) of the motor vehicle. The cylinder 53b is closed at its bottom end by a disk 56 fixed thereto with means known and not described.

As shown in FIG. 3, defined within the cylinder 53b is a chamber 57 designed to house a piston 58, on which an adjustment pin 59 rests. One end 59a of the adjustment pin 59 is in turn screwed to an internal threaded portion of a bushing 60 provided with a terminal flange 61. The bushing 60 is housed partially in a through hole 60a made in the disk 56 and can slide freely in said through hole 60a.

Between the terminal flange 61 and the disk 56, a pack of Belleville washers 62 are tightly fitted; the washers 62 carrying out an indirect elastic action on the piston 58 via the bushing 60 and the adjustment pin 59 screwed thereto. Connected to the piston 58 on the other side of the adjustment pin 59 is a stem 64 terminating with a fork 65.

Also the other end 59b of the adjustment pin 59 is threaded. Screwed to this end 59b is an adjustment detent 63a which is variably tightened for reasons that will be explained in greater detail hereinafter. As best shown in FIGS. 2 and 3, the aforesaid adjustment detent 63a is set between a nut 63 screwed onto the lower end of the adjustment pin 59 and the bottom surface of the disk 56.

To return to the chamber 57, it may be noted that a portion 57a is designed to receive pressurized oil coming from a hydraulic circuit (not shown) of the motor vehicle. More particularly, with reference to FIGS. 2 and 3, it will be seen that the pressurized oil is brought to the portion 57a by means of a hydraulic line 66, inflow of oil being controlled by a solenoid valve 67 (FIG. 2). In addition, the oil contained in the portion 57a is discharged, when needed (see later), through a port 68, visible in FIG. 3, connected directly to the rear-transmission case (not illustrated) of the tractor.

Figure 5:
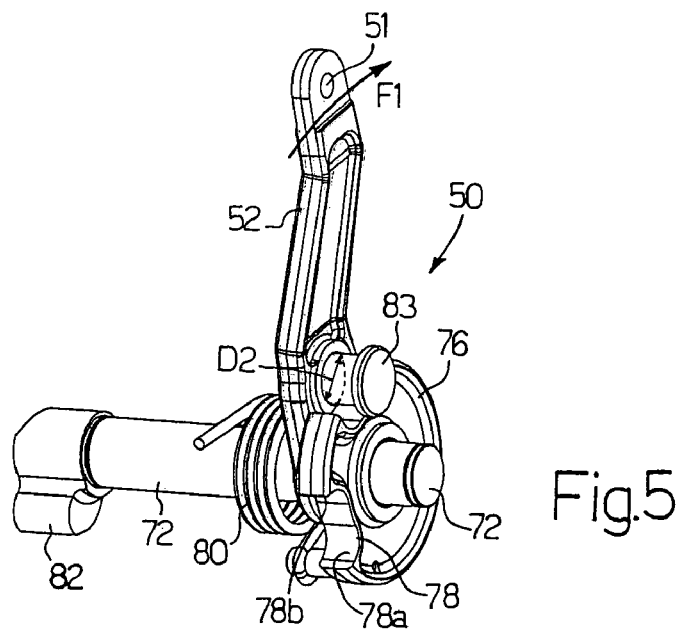
FIG. 5 is a perspective view of some elements belonging to the braking device shown in FIGS. 2–4.

The fork 65 connects the stem 64 via a pin 69 to a crank 70 provided with a circular cavity 71 (FIG. 2) coupled to a shaft 72 (see FIGS. 2 and 5). The coupling of the circular cavity 71 to the shaft 72 is such as to enable free rotation of the crank 70 with respect to the shaft 72. Between the pin 69 and the shaft 72, the crank 70 has a seat 73 designed to receive a pawl 74 for the purposes that will be described more fully hereinafter. The pawl 74 is idle with respect to its own seat 73.

Figure 7:
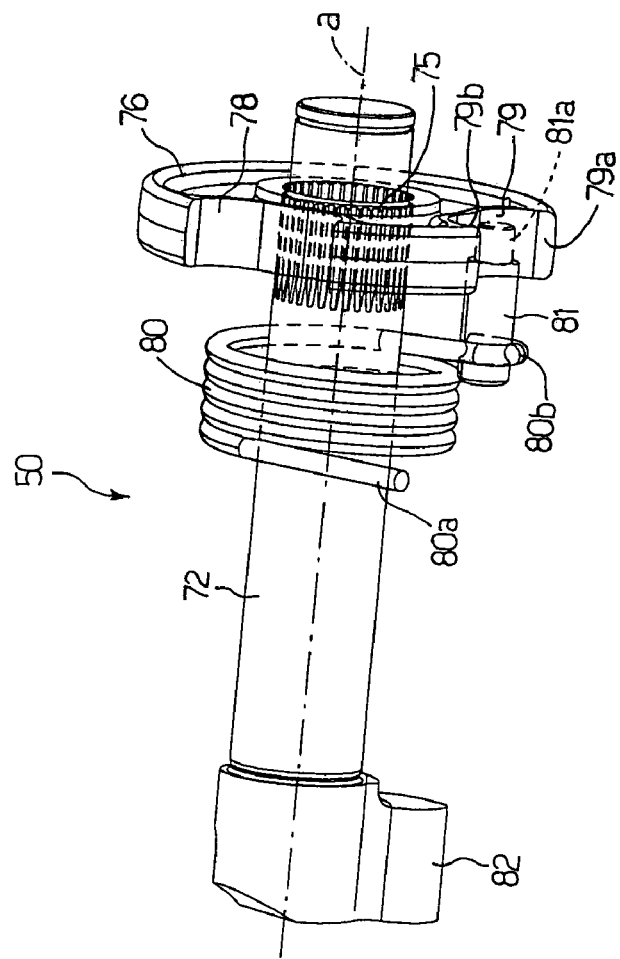
FIG. 7 is a perspective view of some elements used in the braking device of FIGS. 2–6.

As shown in particular in FIGS. 5–8, the shaft 72 is coupled to a cam 76 (FIG. 8, and shown in greater detail in FIG. 9) by means of splines 75 (FIG. 7). In its central part, the cam 76 comprises a toothed seat 77 (FIG. 9) that is coupled to the splines 75 provided on the shaft 72 in such a way that said cam 76 is angularly fixed with respect to the shaft 72. Furthermore, on the periphery of the cam 76, as shown again in FIG. 9, there are provided two shaped cavities 78, 79, which have substantially the same shape and are obtained by removing part of the material constituting the periphery of the cam 76 or by casting the cam 76 with the shaped cavities 78, 79 formed in the periphery.

Figure 9:
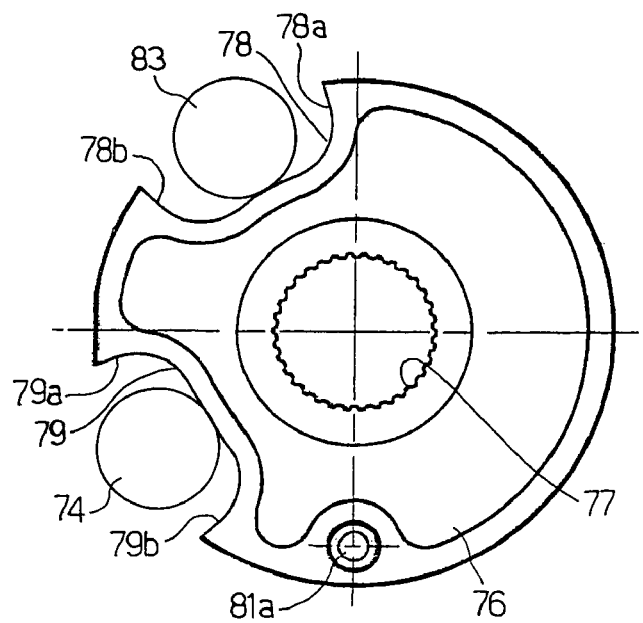
FIG. 9 is a plan view of a cam used in the braking device illustrated in FIGS. 2–8.
Figure 8:
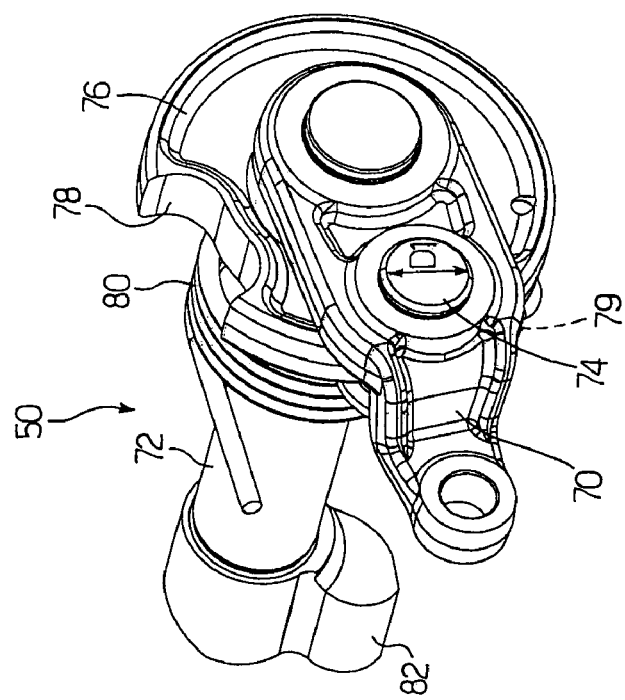
FIG. 8 is a perspective view of some elements used in the braking device of FIGS. 2–7.

The shaped cavity 79 has a length L much greater than the diameter D1 of the pawl 74 (see FIG. 8). In fact, the pawl 74, in use, is located within the shaped cavity 79, as shown in FIG. 9.

The shaft 72 (see FIGS. 7 and 8) is in turn elastically stressed, via the cavities of the cam 76, by a spring 80 wound in a spiral about the longitudinal axis of symmetry (a) of the shaft 72. A first end 80a of the spring 80 rests on an abutment element unitary provided on the main body 53 (not shown), whilst a second end 80b is fixed to a small pin 81 fitted into a seat 81a (FIG. 9) made in the cam 76. The reasons for the presence of the spring 80 will be explained hereinafter.

Provided at one end of the shaft 72 is a shaped element 82 (see FIGS. 4–8), rotation of which, as will be seen more clearly hereinafter, packs together the brake disks 16 so as to brake the wheels W.

Figure 4:
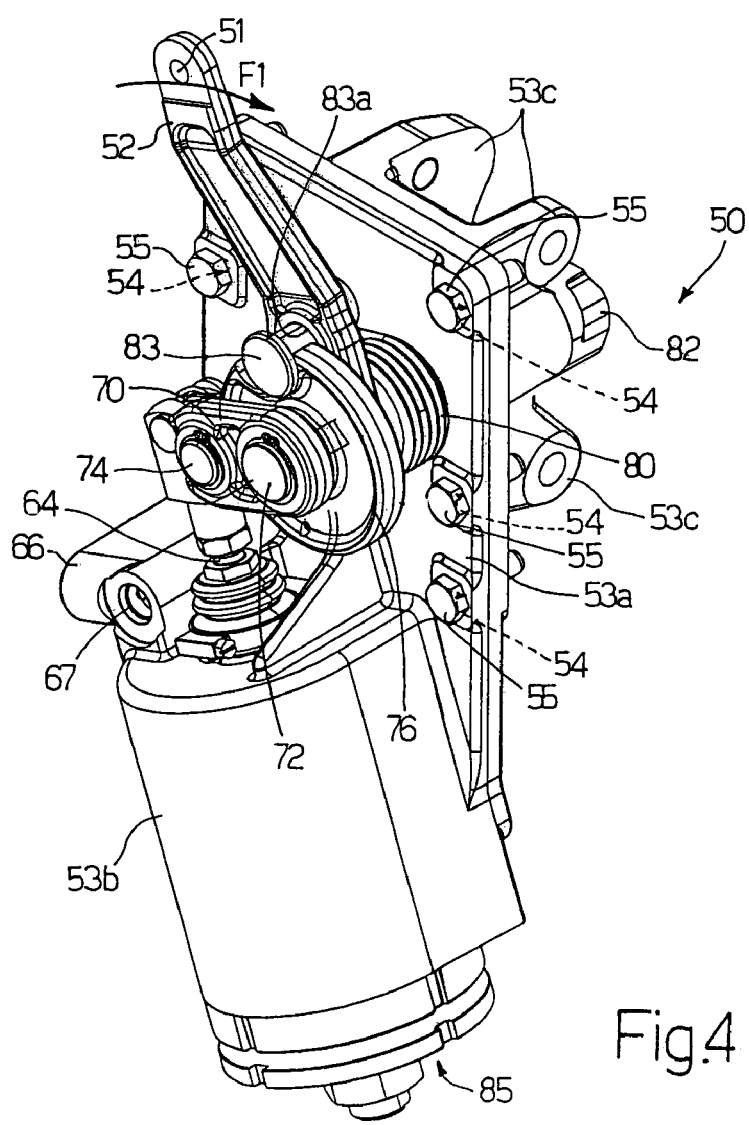
FIG. 4 is a perspective view of the braking device of FIGS. 2 and 3.
Figure 6:
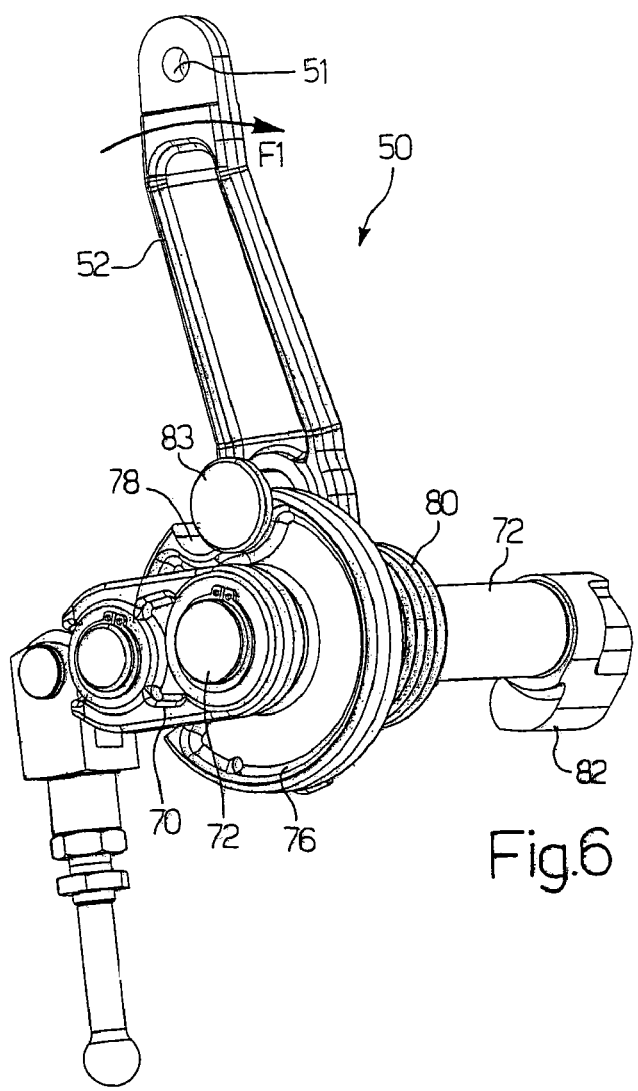
FIG. 6 is a perspective view, from another angle with respect to that of FIG. 5, of some elements belonging to the braking device shown in FIGS. 2–5.

As regards the relay lever 52, at the end opposite to the one where the eyelet 51 is located, there is provided a circular seat (not visible in the figures) engaged by the shaft 72. More particularly, the relay lever 52 can rotate freely with respect to the shaft 72. The cam 76 is thus located between the crank 70 and the relay lever 52, as shown in FIGS. 4 and 5.

The relay lever 52 in turn has a pawl 83 (resting idle in its seat 83a in the lever 52), which, in use, is located within the shaped cavity 78. The pawl 83 has a diameter D2 (FIG. 5) smaller than the length L of the shaped cavity 78 so as to enable its free displacement within the shaped cavity 78.

Consequently, two commands can reach the cam 76.

The first command can be imparted by the piston 58, which, to all effects, forms an integral part of a hydraulic actuator 84 comprising, the elements already described in relation to the cylinder 53b (see above).

Conversely, the second command can reach the cam 76 via the relay lever 52 operated manually by the operator using, for this purpose, the lever 10 (see FIG. 1).

In use, when the engine (not shown) of the motor vehicle is running, also the hydraulic circuit is pressurized. Consequently, from said circuit a certain amount of oil under pressure is deviated, which, through the hydraulic line 66 and the control of the solenoid valve 67 (FIG. 2), fills the portion 57a of the chamber 57. Consequently, the piston 58 moves down, compressing at the same time the pack of Belleville washers 62. Driven by the stem 64, by the fork 65 and by the crank 70, the pawl 74 will be positioned closely to the side 79a of the shaped cavity 79 (see FIGS. 5, 7, and 9), so that the only way for the user to engage the parking brake remains the traditional one of acting manually on the relay lever 52 with the modalities referred to previously. Under the condition where the engine is running, the pawl 83 is located closely to the side 78a of the shaped cavity 78. For simplicity reasons, FIG. 9 shows both pawls 74 and 83 in a middle position of their respective cavities 78, 79 although this does not correspond to an operating position.

Consequently, in the case where the engine is on, the only way to apply the parking brake of the motor vehicle is to rotate the relay lever 52, and hence the cam 76, in the direction indicated by the arrow F1 (see, for example, FIG. 2). In this case, the pawl 83, which is already in the proximity of the side portion 78a of the shaped cavity 78, is immediately pushed against the wall 78a of the shaped cavity 78, causing rotation in the direction of the arrow F1 of the shaft 72 and of the shaped element 82, which, as has been said, actuates the brake disks 16. Such a rotation is enabled because pawl 74 is close to wall portion 79a and thus there is a considerable gap between said pawl 74 and the wall portion 79b.

In other words, when the engine is on, each of the pawls 74 and 83 is located in an almost extreme upward position of its own shaped cavity 79 and 78, respectively. In this condition, when the brake is operated manually, the pawl 83 will immediately contact the top portion 78a and will cause rotation of the cam 76 in the direction of the arrow F1. This is possible because there is a sufficient amount of space between the other pawl 74 and the bottom portion 79b of the shaped cavity 79. When the engine is off and the handbrake is not operated, the pawl 74 will move upward and immediately contact the top portion 79a (on account of the pressure drop in the cylinder) and will set the cam 76 again in rotation in the direction of the arrow F1. This is again rendered possible by the fact that there is a sufficient space between the pawl 83 and the bottom portion 78b of the shaped cavity 78, since at the instant when the engine is still on, the pawl 83 is located close to the wall portion 78a.

If the operator so desires, he can have both systems active at the same time. With the engine off, and consequently the brake on by the action of the pawl 74. the operator is still able to also put the handbrake on, by pulling the lever 51 lever 52 in the direction of an arrow F1 and thereby moving pawl 83 towards and in contact with wall portion 78a. At this instance, both pawls 74 and 83 are in contact with the respective wall portions 79a and 78a and braking is thus ensured both by the hydraulic system and the mechanical system. Should the engine be switched on again, the pawl 74 will release wall portion 79a and move in the direction of wall portion 79b. the cam 76 however will not rotate because it is prevented from doing so by pawl 83 still pressing against wall portion 78a. The brake therefore will remain on until the handbrake lever 10 also has been released.

As appears again from FIG. 9, the bottom ends of the shaped cavities 78, 79 are slightly curved because said cavities 78, 79 are preferably made with a ball-end two-fluted mill with a circular path. In so far as the path of the two pawls 83 and 74, respectively, is circular, there consequently is no need for the bottom ends to be rectilinear, as long as the pawls 74 and 83 do not interfere with the slightly raised middle portion of the respective cavities 78 and 79 during their circular movement therethrough.

When the operator wants to disengage the hand brake (once again with the engine on) all he has to do is to release the lever 10 (FIG. 1), and the system will return to the initial position thanks to the elastic action exerted by the spring 80 on the cam 76. In this case, both the relay lever 52 and the cam 76 will rotate in the direction identified by the arrow F2 (see for example FIG. 2).

Conversely, in the case where the engine is turned off, the hydraulic circuit is connected to the discharge. Consequently, also the pressurized oil present in the portion 57a is discharged through the port 68. Hence, the pack of Belleville washers 62 is allowed to push the bushing 60 upwards, as well as the adjustment pin 59, the piston 58, the stem 64, the fork 65, the crank 70, and the pawl 74, which will exert a thrust on the wall of the top portion 79a of the shaped cavity 79 (FIG. 9). Also in this case, the cam 76 will turn in the direction of the arrow F1 and will engage the brake according to what has been said previously. It is to be noted that the action of the Belleville washers 62 overcomes the oppositely directed action of the spring 80.

A further function of the parking brake 100 is the park-lock function. Acting on the solenoid valve positioned in point 67, it is possible to discharge the pressurized oil present in the portion 57a through the port 68 obtaining the same result as in the case described previously. This is a particular function that is required from the motor vehicle with the engine running when the driver wants to be certain that the vehicle will remain still in particular conditions of maneuver without having to operate the lever 10 in the cab.

In the park-lock situation, to disengage the parking brake, it is sufficient to re-supply the solenoid valve with electrical current in order to send pressurized oil again into the portion 57a.

Consequently, it may be stated that, with the parking brake 100 forming the subject of the present invention, the system for blocking the wheels W will be activated automatically whenever the engine of the motor vehicle is turned off or else when the signal to the control solenoid valve of the device is intentionally interrupted, whilst there will always be the possibility of engaging the hand brake manually both with the engine off and with the engine on. In addition, it should be noted that, both when the actuator 84 goes into action and when the relay lever 52 is pulled manually, the same cam 76 provided with the two shaped cavities 78, 79 is used.

If there were a breakdown such as to cause the engine to be turned off, or some fault of the hydraulic circuit, or else a failure of a signal to arrive to the solenoid valve for control of the braking device, the oil would be discharged by the portion 57a through the port 68, and the hand brake would remain engaged owing to the action of the actuator 84.

However, in this case, to enable the towing of the motor vehicle, the hand brake can be disengaged by resorting to an emergency device 85, which basically comprises the nut 63 and the adjustment detent 63a (see for example FIG. 3). If the adjustment detent 63a is screwed on the threading provided on the end 59b until it presses against the bottom of the disk 56, the emergency pin 59 will be pulled down, allowing the other elements connected thereto to move downwards, including the cam 76, which will rotate in the direction of the arrow F2. In this connection, it should be noted that the permanent contact of the tip of the adjustment pin 59 with the bottom wall of the piston 58 is ensured by the presence of the return spring 80 which will cause a return action on respectively the cam 76, the pawl 74, the fork 65, the stem 64, and ultimately the piston 58, which, consequently, will always remain pressed against the tip of the adjustment pin 59.

Advantages of the present parking brake are the following:

assurance that, when the engine is off, the motor vehicle will, in all cases, have its parking brake automatically engaged; and commands unified in a single cam, both in the case of automatic engagement of the parking brake and in the case of manual operation via a lever rotated by the operator in the cab.

The invention claimed is:

1. A parking brake for a motor vehicle, said brake comprising:
   a lever for manual operation by on operator;
   braking means operatively connected to wheels of the motor vehicle, said braking means including a shaft;
   a cam affixed to said shaft, periphery of said cam defining a plurality of cavities;
   a crank rotatably couple to said shaft;
   a crank detent affixed to said crank, said crank detent extending toward said cam into one of the plurality of cavities;
   a hydraulic actuator connected to said crank;
   a lever rotatably coupled to said shaft; and
   a lever detent affixed to said lever, said lever detent extending toward said cam into one of the plurality of cavities;
   wherein said braking means is one of (i) hydraulically actuated when an engine of the motor vehicle is off, (ii) manually actuated by the operator through said lever whatever the running state of the engine of the motor vehicle, and (iii) both hydraulically actuated and manually actuated.

2. A parking brake according to claim 1, wherein the hydraulic actuator is operatively connected to a control solenoid valve, said solenoid valve being operable to command activation of said braking means through said hydraulic actuator even when the engine of the motor vehicle is running.

3. A parking brake according to claim 1, wherein said hydraulic actuator includes a cylinder and a piston defining a region and containing oil coming from a hydraulic circuit, wherein a pressure drop in the region due to an engine of the motor vehicle being switched off effects actuation of said braking means.

4. A parking brake according to claim 3, said hydraulic actuator further comprising elastic means operable to raise said piston upon the occurrence of a hydraulic pressure drop, wherein said piston is connected to said crank.

5. A parking brake according to claim 1, further comprising elastic means configured to bring back said shaft and said cam into their initial positions once the effect of said hydraulic actuator or of said lever thereon has terminated.

6. A parking brake according to claim 1, further comprising first elastic means configured to bring back said shaft and said cam into their initial positions once the effect of said hydraulic actuator or of said lever thereon has terminated and second elastic means configured to extend said hydraulic actuator, said first and second elastic means generating a force and a counter-force, respectively, wherein the counter-force exerted by said second elastic means is larger than the force exerted by said first elastic means.

7. A parking brake according to claim 6, said hydraulic actuator comprising an emergency device for interrupting the action of said second elastic means on said hydraulic actuator and allowing said first elastic means to release the braking action of said braking means in case of breakdown of an engine of the motor vehicle.

8. A parking brake for a motor vehicle, said brake comprising:
   a lever for manual operation by an operator;
   braking means operatively connected to wheels of the motor vehicle, said braking means including a shaft;
   a cam affixed to said shaft, periphery of said cam defining a plurality of cavities;
   a crank rotatably couple to said shaft;
   a crank detent affixed to said crank, said crank detent extending toward said cam into one of the plurality of cavities;
   a hydraulic actuator connected to said crank;
   a lever rotatably couple to said shaft; and a lever detent affixed to said lever, detent extending toward said cam into one of the plurality of cavities, wherein said lever and crank detents and the cavities are sized to permit free play of said detents within the cavities; and further wherein the free play between said detents and their respective cavities allows four different configurations of said detents relative to one another resulting in four different braking conditions consisting of:

i. engagement of said braking means solely by said lever;

ii. engagement of said braking means solely by the hydraulic actuator;

iii. engagement of said braking means by both said lever and said hydraulic actuator; and iv. full release of said braking means.

* * * * *